Sept. 14, 1943. G. S. MINIUM 2,329,408
TRAILER TRUCK FRAME
Filed Jan. 17, 1942
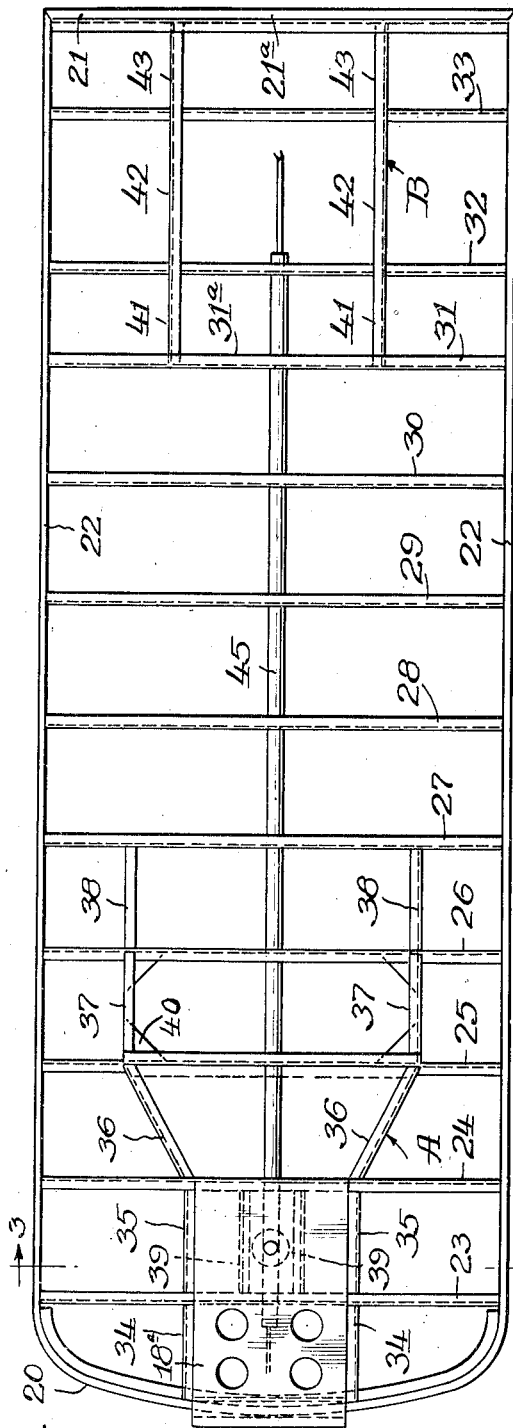
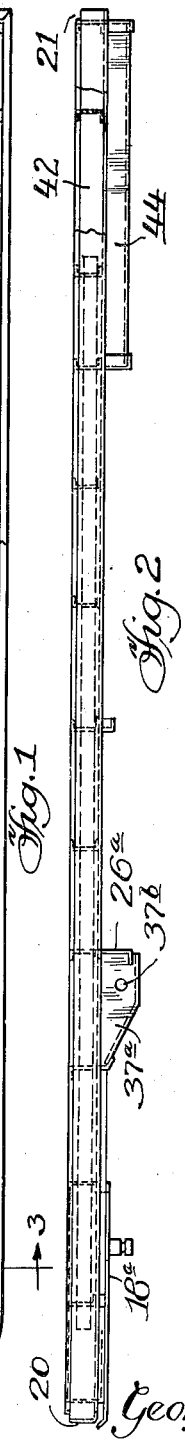
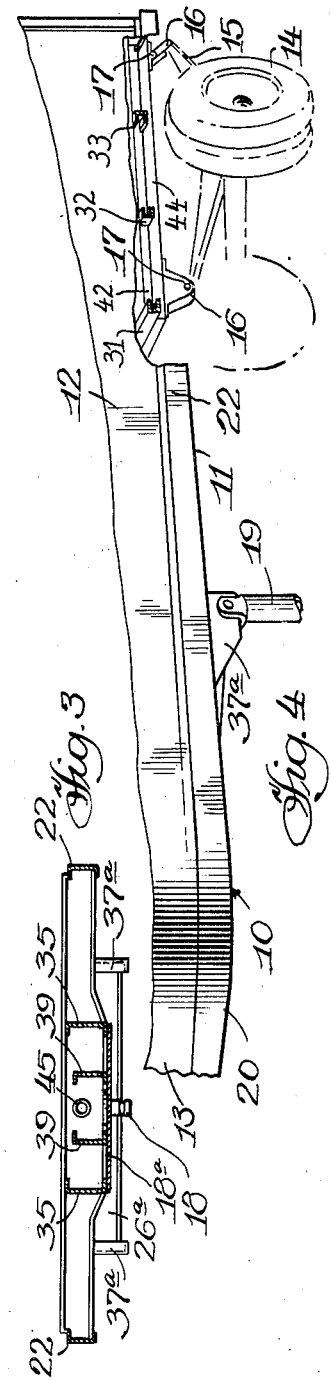
INVENTOR.
George S. Minium Patented Sept. 14, 1943

2,329,408

UNITED STATES PATENT OFFICE 2,329,408

TRAILER TRUCK FRAME

George S. Minium, Chicago, Ill.

Application January 17, 1942, Serial No. 427,085

2 Claims. (Cl. 280—106)

This invention relates to improvements in frame structure for trucking or road haulage vehicles, and has for its principal object to provide a frame structure for such vehicles combining relative lightness in weight with maximum strength to withstand the shocks and stresses incident to the use of such vehicles.

As is well known, commercial road haulage vehicles are usually subject to legal regulations not only as to size, but as to permissible total weight, including body and load, so that they will not cause undue damage or wear on highway surfaces. Therefore, any saving in weight of the vehicle body permits increase in the load-carrying capacity of such vehicles.

In carrying out my invention, I provide an integral vehicle base frame structure especially applicable to trucks of the semi-trailer type, wherein the usual separate undercarriage or frame is dispensed with. Instead, the base frame includes longitudinal and transverse frame members, all disposed in substantially the same horizontal plane, so as to form the floor of the body, with means for connecting the springs and other running gear attachments directly to the under side of said base frame. I also provide an improved form of structural frame units or box sections for supporting the running gear at opposite ends of the frame, together with a centrally disposed main draft and stiffening member for connecting the two end frame structures together.

The invention may best be understood by reference to the accompanying drawing, in which Fig. 1 is a bottom view of a vehicle frame constructed in accordance with my invention.

Fig. 2 is a side view of the frame shown in Fig. 1.

Fig. 3 is a detail cross section taken on line 3—3 of Fig. 1.

Fig. 4 is a fragmentary perspective view of the lower portion of a semi-trailer truck body embodying the frame structure shown in the preceding figures.

Referring now to details of the embodiment of the invention shown in the drawing, the truck body indicated generally at 10 includes a base frame 11 and upright side and end walls 12 and 13. The truck body shown is of the semi-trailer type, and may be provided as usual with rear wheels 14 and springs 15 connected to the under side of the base frame by shackles 16, 16 and connecting brackets 17, 17. The front end of the body may be connected to a motor tractor (not shown) by a fifth wheel device of any suitable form, including a king pin 18 depending from a horizontal bearing plate 18a herein fixed below the front end of the base frame. When disconnected from the motor tractor, the truck body is temporarily supported at its front end by any suitable form of foldable or detachable ground braces indicated at 19.

The base frame 11 includes front and rear end sills 20 and 21, side sills 22, 22 and an intermediate framework including three groups of channelled cross members, all spaced substantially equi-distant from each other. In the form shown herein, the first group of cross members consists of five cross members 23, 24, 25, 26 and 27 adjacent the front of the frame, the second group consists of three cross members 28, 29 and 30 in the central portion of the frame, and the third group consists of three cross members 31, 32 and 33 near the rear of the frame.

Two similar sets of longitudinally extending beams or braces 34, 35, 36, 37 and 38 are arranged in end to end relationship and are rigidly connected between the front end sill 20 and the five cross members which constitute the first group of cross members. Each set of said beams is spaced from its adjacent side sill 22, so that said longitudinal beams, together with the central portion 20a of the end sill and the central portion 27a of cross member 27 define in effect a box section indicated generally at A in Fig. 1. As will be seen in this figure, certain of the longitudinal braces 36, 36 are angularly disposed outwardly and rearwardly so that the box section A is widened toward its rear end, for the purpose hereinafter described. As will be observed further from Fig. 2, the longitudinal beams 34, 35 and 36 are extended vertically a slight distance below the general bottom level of the frame, and the central portion of the cross members 23 and 24 are also widened correspondingly.

The bearing plate 18a of the fifth wheel device is rigidly secured to the bottom flanges of beams 34 and 35, cross members 23 and 24, and a transverse brace 20a depending from the front sill 20, so as to provide an especially strong and rigid supporting structure for the front end of the frame adjacent the king pin 18. To further reinforce the box structure at this point, two intermediate longitudinal beams 39, 39 are connected between the cross members 23 and 24 and secured to the bearing plate 18a.

It will be understood that all of the frame members are rigidly secured together, preferably by welding, so as to form an integral or unitary frame structure, all in substantially the same horizontal plane.

To provide a support for the ground braces 19, 19, the longitudinal beams 37, 37 at the widened rear end portion of the box section A are provided with depending extensions or ears 37ª, 37ª to which the said ground braces may be suitably connected, as by hinging at hole 37ᵇ. The cross member 26 at the rear end of the extensions 37ª, 37ª has a channelled cross member 26ª secured along its bottom flange and disposed in the same vertical plane, as shown in Fig. 2. The beams 37, 37 may be further reinforced by gussets 40, 40 secured across the four points of juncture with the cross members 25 and 26.

At the rear end of the frame two similar sets of longitudinal beams 41, 42 and 43 are arranged end to end to each other and rigidly secured between the third group of cross members 31, 32 and 33 and the rear end sill 21, respectively. Said longitudinal beams together with the central portions 31ª of cross member 31 and the central portion 21ª of end sill 21, define in effect a box section indicated generally at B in Fig. 1. The longitudinal beams 41, 42 and 43 are preferably reinforced by continuous channel members 44, 44 which extend below the general plane of the frame so as to form supports to which the brackets 17, 17 for rear spring shackles 16, 16 shown in Fig. 4 are rigidly mounted in any suitable manner.

Extending longitudinally and centrally of the main frame is a tubular member 45 arranged to connect the front box section A from a point immediately adjacent the king pin 18 with rear box section B. Said tubular member passes through the several cross members of the front and central sections of the frame, and also through at least two cross members 31 and 32 of the rear box section, and is rigidly connected to each of said cross members as by welding, so as to provide an especially strong and yet light frame structure, including reinforced box sections for the front and rear weight-supporting areas, and a novel form of torsion-resistant draft connection between said box sections.

The tubular member 45 also provides a conduit for electric tail lights and traffic signal cables 46 from the front to the rear end of the vehicle. Thus the tubular member 45 forms the main draft element between the box sections A and B, as well as a torsion-resisting and stiffening member for the entire frame.

Although I have shown and described one particular embodiment of my invention, it will be understood that I do not wish to be limited to the exact construction shown and described, but that various changes and modifications may be made without departing from the spirit and scope of my invention as defined in the appended claims.

I claim as my invention:

1. An integral vehicle frame comprising end sills, side sills, a plurality of cross members, longitudinal beams connecting a group of cross members adjacent the front end of said frame to form an elongated box section between said side sills, vehicle supporting means for the front end of said frame directly connected to the cross members adjacent the front end of said box section, reinforced extensions directly connected to other cross members adjacent the rear of said elongated box section and at the opposite sides of the latter affording connection for other vehicle supporting means, other longitudinal beams connecting a second group of cross members adjacent the rear end of said frame to form a second box section, supporting means for the rear end of said frame directly connected to said box section, and a centrally disposed, longitudinally extending tubular draft member having its opposite ends rigidly connected to a plurality of cross members forming each of said box sections, and also rigidly connected to the cross members disposed between said box sections.

2. An integral vehicle frame comprising end sills, side sills, a plurality of cross members, longitudinal beams connecting a group of cross members adjacent the front end of said frame to form an elongated box section widened at the rear end of the latter, vehicle supporting means for the front end of said frame directly connected to the front end of said box section, reinforced extensions adjacent the widened rear of said elongated box section and at the opposite sides thereof affording connection for other vehicle supporting means, other longitudinal beams connecting a second group of cross members adjacent the rear end of said frame to form a second box section, supporting means for the rear end of said frame directly connected to said box section, and a centrally disposed, longitudinally extending tubular draft member having its opposite ends rigidly connected to a plurality of cross members forming each of said box sections, and also rigidly connected to the cross members disposed between said box sections.

GEORGE S. MINIUM.